US012811510B2

(12) United States Patent
Chen et al.

(10) Patent No.: US 12,811,510 B2
(45) Date of Patent: Nov. 24, 2026

(54) INVERTER AND PHOTOVOLTAIC SYSTEM

(71) Applicant: Huawei Digital Power Technologies Co., Ltd., Shenzhen (CN)

(72) Inventors: Chao Chen, Xi'an (CN); Zheng Ma, Xi'an (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 177 days.

(21) Appl. No.: 18/802,420

(22) Filed: Aug. 13, 2024

(65) Prior Publication Data

US 2024/0405692 A1 Dec. 5, 2024

Related U.S. Application Data

(63) Continuation of application No. PCT/CN2023/075867, filed on Feb. 14, 2023.

(30) Foreign Application Priority Data

Feb. 15, 2022 (CN) ......................... 202220304849.8

(51) Int. Cl.

| | |
|---|---|
| ***H02M 7/00*** | (2006.01) |
| ***H01R 12/70*** | (2011.01) |
| ***H02J 3/38*** | (2006.01) |
| ***H02M 7/44*** | (2006.01) |
| *H01R 12/75* | (2011.01) |
| *H02J 101/24* | (2026.01) |

(52) U.S. Cl.

CPC ........ *H02M 7/003* (2013.01); *H01R 12/7047* (2013.01); *H02J 3/381* (2013.01); *H02M 7/44* (2013.01); *H01R 12/75* (2013.01); *H02J 2101/24* (2026.01)

(58) Field of Classification Search

None

See application file for complete search history.

(56) References Cited

U.S. PATENT DOCUMENTS 5,951,785 A * 9/1999 Uchihashi ............... H10F 77/68 136/246
7,291,036 B1 * 11/2007 Daily .................... H02S 40/345 439/76.1

(Continued)

FOREIGN PATENT DOCUMENTS

CH 705665 A1 4/2013
CN 201754409 U 3/2011

(Continued)

*Primary Examiner* — Xanthia C Relford

(74) *Attorney, Agent, or Firm* — Conley Rose, P.C.

(57) ABSTRACT

An inverter includes a housing and a first connector, where a circuit board is disposed on an inner side of the housing, and an inverter circuit is disposed in the circuit board. The first connector includes a first housing and a first conductive core. The first housing is fastened to the housing. The first conductive core is located in the first housing and extends into the inner side of the housing. The first conductive core includes a first connecting plate located on the inner side of the housing. The first connecting plate is of a flat structure. The first connecting plate can be connected to the circuit board without a cable.

19 Claims, 9 Drawing Sheets

(56) References Cited

U.S. PATENT DOCUMENTS

| | | | | |
|---|---|---|---|---|
| 7,297,866 | B2 * | 11/2007 | Aschenbrenner | H02S 20/23 136/246 |
| 9,118,273 | B2 * | 8/2015 | Martin | H02S 40/32 |
| 9,263,183 | B2 * | 2/2016 | Chapman | H02J 3/381 |
| 9,813,019 | B2 * | 11/2017 | Zhong | H01R 13/6641 |
| 11,177,639 | B1 * | 11/2021 | Nguyen | H02G 3/22 |
| 2008/0110490 | A1 * | 5/2008 | Duesterhoeft | H02S 40/34 136/248 |
| 2009/0275247 | A1 * | 11/2009 | Richter | H01R 4/185 439/502 |
| 2009/0291594 | A1 * | 11/2009 | Donth | H02M 7/003 439/620.29 |
| 2011/0058337 | A1 * | 3/2011 | Han | H02S 40/34 361/717 |
| 2011/0240088 | A1 * | 10/2011 | Ecob | H02S 40/34 174/59 |
| 2015/0144181 | A1 * | 5/2015 | Gilchrist | H02S 40/34 136/251 |
| 2015/0188486 | A1 * | 7/2015 | Marroquin | H02S 40/32 361/752 |
| 2016/0324020 | A1 * | 11/2016 | Sato | H05K 7/1432 |
| 2018/0184542 | A1 * | 6/2018 | Aitzetmueller | H02M 7/003 |
| 2018/0331652 | A1 * | 11/2018 | Okawa | H02S 40/32 |
| 2019/0020136 | A1 | 1/2019 | Fehse | |
| 2021/0226364 | A1 | 7/2021 | Khaligh et al. | |

FOREIGN PATENT DOCUMENTS

| | | | | |
|---|---|---|---|---|
| CN | 201946785 | U | | 8/2011 |
| CN | 203747747 | U | | 7/2014 |
| CN | 204257843 | U | | 4/2015 |
| CN | 204315744 | U | | 5/2015 |
| CN | 104882682 | A | | 9/2015 |
| CN | 205945500 | U | | 2/2017 |
| CN | 205985400 | U | | 2/2017 |
| CN | 107228717 | A | | 10/2017 |
| CN | 107819259 | A | | 3/2018 |
| CN | 107919851 | A | | 4/2018 |
| CN | 207460023 | U | | 6/2018 |
| CN | 209731088 | U | | 12/2019 |
| CN | 111342737 | A | | 6/2020 |
| CN | 112003051 | A | | 11/2020 |
| CN | 213817689 | U | | 7/2021 |
| CN | 217691716 | U | | 10/2022 |
| JP | H01166983 | U | | 11/1989 |
| JP | 2012146564 | A | | 8/2012 |
| JP | 2013145707 | A | | 7/2013 |
| JP | 2016096637 | A | | 5/2016 |
| JP | 2016140128 | A | | 8/2016 |
| JP | 2017005817 | A | | 1/2017 |
| JP | 2017079269 | A | * | 4/2017 |
| JP | 2017079547 | A | | 4/2017 |
| JP | 2018073517 | A | | 5/2018 |
| WO | 2015196994 | A1 | | 12/2015 |

* cited by examiner

INVERTER AND PHOTOVOLTAIC SYSTEM

CROSS-REFERENCE TO RELATED APPLICATIONS

This is a continuation of International Patent Application No. PCT/CN2023/075867 filed on Feb. 14, 2023, which claims priority to Chinese Patent Application No. 202220304849.8 filed on Feb. 15, 2022. The disclosures of the aforementioned applications are hereby incorporated by reference in their entireties.

TECHNICAL FIELD

This disclosure relates to the field of photovoltaic technologies, and in particular, to an inverter and a photovoltaic system.

BACKGROUND

In a photovoltaic system, electric energy of a photovoltaic module needs to be transmitted to an inverter to implement current inversion, so that the electric energy enters an end user or is fed into a grid. A male connector may be installed at the photovoltaic module end, and a female connector may be installed at the inverter end. After the male connector is connected to the female connector, an electrical connection between the photovoltaic module and the inverter can be implemented. In actual application, at the inverter end, a conductive core of the connector is electrically connected to a circuit board inside the inverter through a section of cable. The cable needs to be electrically connected to both the conductive core and the circuit board. Therefore, an installation step is complex, and a connection reliability problem is likely to occur. In an existing manner, a connection terminal is disposed at an end of the conductive core, and the connection terminal is inserted into the circuit board to implement the electrical connection, without the cable. However, connection stability of the connection terminal inserted into the circuit board is poor, and an additional connection mechanism is required to connect the conductive core and the circuit board, resulting in a complex structure.

SUMMARY

This disclosure provides an inverter that does not require a cable and can improve stability of a connection between a connector and a circuit board.

According to a first aspect, an implementation of this disclosure provides an inverter. The inverter includes a housing and a first connector, where a circuit board is disposed on an inner side of the housing, and an inverter circuit is disposed in the circuit board. The first connector includes a first housing and a first conductive core, where the first housing is fastened to the housing, the first conductive core is located in the first housing and extends into the inner side of the housing, the first conductive core includes a first connecting plate located on the inner side of the housing, the first connecting plate is of a flat structure, the first connecting plate is fastened to the circuit board and is electrically connected to the inverter circuit, an end that is of the first conductive core and that is away from the first connecting plate is configured to connect to a photovoltaic module, the first conductive core is configured to transmit, by using the first connecting plate, a direct current generated by the photovoltaic module to the inverter circuit, the inverter circuit converts the direct current into an alternating current, and the flat structure is configured to improve connection stability and current transmission stability when the first connecting plate is fastened to the circuit board.

The first housing in the first connector is configured to protect the first conductive core, and is configured to fasten the first conductive core to the housing. The first conductive core in the first connector is configured to: transmit electricity, and transmit the direct current in the photovoltaic module to the inverter circuit in the circuit board, to convert the direct current into the alternating current.

In an implementation, the first conductive core is in a straight strip shape, and the part that is of the first conductive core and that is away from the first connecting plate is in a hollow cylindrical shape. The first connecting plate is of the flat structure, which can increase a contact area between the first connecting plate and the circuit board, to facilitate fastening of the first connecting plate to the circuit board, ensure good electrical connectivity between the first connecting plate and the circuit board, and improve connection stability and electrical transmission stability. In an implementation, the first connecting plate is welded on the circuit board. Because the first connecting plate is of the flat structure, the first connecting plate and the circuit board each have a large welding area, thereby providing welding stability. In an implementation, a plane on which the first connecting plate is located is parallel to a board surface of the circuit board, thereby improving stability and reliability of the connection between the first connecting plate and the circuit board.

In a possible implementation, the first connecting plate and the circuit board are stacked in a first direction, at least a part of a projection that is of the first connecting plate and that is on the circuit board in the first direction is located on the circuit board, the first connecting plate and the circuit board have a partial intersection in a second direction, to shorten a distance between the first connecting plate and the circuit board in the second direction, and the first direction is perpendicular to the second direction. The first connecting plate may be directly connected to the circuit board in the second direction, without disposing a cable between the circuit board and the first connecting plate in the second direction. In addition, the distance between the first connecting plate and the circuit board is shortened, so that a current output from the first connecting plate can be directly input to the circuit board, thereby effectively shortening a length of a current input path of the inverter and reducing interference caused by an environment to the current input of the inverter.

In an implementation, the first direction is a thickness direction of the inverter, and the second direction is a width direction of the inverter.

In an implementation, an orthographic projection that is of the first connecting plate and that is on the circuit board may be located outside the circuit board, and the first connecting plate may be connected to the circuit board by using a connection component.

In an implementation, the first connecting plate is formed by stretching an end of the first conductive core, which can save preparation costs. In an implementation, the first conductive core is formed through integral machining or integrated injection molding.

The first housing is fastened to the housing by using screws, through welding, or the like. In an implementation, the first housing extends to the inner side of the housing, and the first housing is fastened to the housing by using a screw nut. The first housing wraps a part that is of the first conductive core and that is located on an outer side the housing, and the first conductive core is fastened to the housing by being fastened to the first housing.

An existing MC4 (MC is short for Multi-Contact, and 4 indicates a 4 millimeter (mm) diameter of a metal core) or imitated MC4 connector in the market includes a male connection component and a female connection component that are detachably connected. An end that is of the male connection component and that is away from the female connection component is connected to the circuit board, and an end that is of the female connection component and that is away from the male connection component is connected to the photovoltaic module. Alternatively, an end that is of the female connection component and that is away from the male connection component is connected to the circuit board, and an end that is of the male connection component and that is away from the female connection component is connected to the photovoltaic module. In an implementation, processing such as stamping and rolling is performed at an end of a conductive core of the existing male connection component or female connection component in the market, so that the end of the conductive core is of a flat structure, to produce the first connector.

In another technology, the MC4 or the imitated MC4 connector is directly connected to the circuit board through a cable. Because internal space of the inverter is limited, a bending radius of the cable fails to meet a standard, and internal cables of the inverter are messy, which leads to difficult installation and low installation efficiency of the inverter and an improper connection problem. When the inverter is connected to a plurality of MC4 or imitated MC4 connectors of a plurality of photovoltaic modules, more cables are required inside the inverter to connect the MC4 or the imitated MC4 connectors to the circuit board, so that the cables inside the inverter are messier, and the installation of the inverter is more difficult. In addition, both ends of the cable need optical terminals (OTs) to be respectively connected to the circuit board and the MC4 connector, so that a contact resistance and generated heat of an entire loop are high, and efficiency of the entire inverter is reduced.

However, in this disclosure, the first connecting plate in the first connector is disposed as the flat structure, and the first connecting plate may be directly connected to the circuit board. In one aspect, a connection between the first connector and the circuit board is more convenient, and the installation of the inverter is simpler and more efficient. In another aspect, the first connector is connected to the circuit board without the cable, so that the contact resistance and the generated heat between the first connector and the circuit board are reduced, and work efficiency of the inverter is improved. In addition, impact of poor contact between the first connector and the circuit board can be reduced in processing, transportation, and assembly processes, and a risk of excessive heat generation or even fire caused by a long-term connection between the first connector and the circuit board is reduced. In yet another aspect, the distance between the first connecting plate and the circuit board is shortened, so that space at a connection joint between the first connecting plate and the circuit board is saved, space utilization and power density of the inverter are improved, a length of a photovoltaic input path is effectively shortened, and interference caused by the environment to the photovoltaic input is reduced.

In a possible implementation, an opening is disposed on the first connecting plate, the inverter further includes a fastening member, and the fastening member passes through the opening and is fastened to the circuit board, to fasten the first connecting plate to the circuit board. The opening is disposed, so that the connection between the first connecting plate and the circuit board is simpler and more convenient.

In an implementation, a shape of the opening may be a round hole, an elliptical hole, a square hole, a U-shaped notch, or any other suitable shape. In an implementation, the fastening member may be a screw, a snap-fit, or the like. In an implementation, the shape of the opening is the round hole, the fastening member is a screw bolt and a screw nut that are matched, and a hole that penetrates the circuit board is disposed on the circuit board. The screw bolt sequentially passes through the opening, the hole, and the screw nut, to fasten the first connecting plate to the circuit board.

In a possible implementation, a connection terminal is disposed on the circuit board, the first connecting plate, the connection terminal, and the circuit board are sequentially stacked in a first direction, the first direction is perpendicular to the circuit board, the connection terminal is fastened to the circuit board and is electrically connected to the circuit board, a pore channel is disposed at the connection terminal, and an opening is disposed on the first connecting plate. The inverter further includes a fastening member, and the fastening member passes through the opening in the first direction and extends into the pore channel, to fasten the first connecting plate to the connection terminal. The connection terminal is disposed, so that the connection between the first connecting plate and the circuit board is simpler and more convenient. In an implementation, a screw thread is disposed in the pore channel, the fastening member is a screw, and the screw and the screw thread cooperate with each other, so that the first connecting plate can be more reliably fastened to the connection terminal.

In an implementation, a socket is disposed on the circuit board, the socket is electrically connected to the circuit board, the first connecting plate is inserted into the socket and is electrically connected to the socket, and further, the first connecting plate is electrically connected to the circuit board. An internal structure of the socket is not limited, provided that when the first connecting plate is inserted into the socket, the first connecting plate can be fastened to the socket and be electrically connected to the socket.

In a possible implementation, the first conductive core includes a first conductive core body and the first connecting plate, the first conductive core body passes through an outer side and the inner side of the housing, the first connecting plate is located at an end of the first conductive core body, and an extension direction of the first connecting plate is the same as an extension direction of the first conductive core body, to facilitate processing of the first conductive core.

In a possible implementation, the first conductive core includes a first conductive core body and the first connecting plate, the first conductive core body passes through an outer side and the inner side of the housing, the first connecting plate is located at an end of the first conductive core body, and an extension direction of the first connecting plate intersects with an extension direction of the first conductive core body, so that the first conductive core can adapt to a plurality of installation environments. In an implementation, the first connecting plate is in a linear shape, and an included angle between the first connecting plate and the first conductive core body is greater than 0 degrees) (°) and less than 180°. In an implementation, the first connecting plate is in an arc shape.

In a possible implementation, the first conductive core further includes a first connection section, the first connection section is located between the first conductive core body and the first connecting plate, and an extension direction of the first connection section intersects with both the extension direction of the first conductive core body and the extension direction of the first connecting plate, so that the first conductive core can adapt to the plurality of installation environments. In an implementation, an included angle between the first connection section and the first conductive core body is greater than 0° and less than 180°, an included angle between the first connection section and the first connecting plate is greater than 0° and less than 180°, and the first conductive core is in a “Z” shape.

In an implementation, the inverter includes two first connectors. The first conductive core of one of the first connectors is in a “Z” shape, the first conductive core of the other of the first connectors is in a linear shape, and the first conductive cores of the two first connectors are staggered, which can save space of the inverter.

In a possible implementation, the first connector further includes an insulation part, and the insulation part covers an outer surface of the first connection section, to insulate and isolate the first connection section from an external environment, thereby reducing a risk of a short circuit occurring in the first connection section.

In a possible implementation, the first conductive core body and the first connecting plate are of an integrated structure, which enhances connection strength between the first conductive core body and the first connecting plate, and prolongs a service life of the first connector.

In a possible implementation, the inverter further includes a temperature sensor, the temperature sensor is located on the circuit board and is located on a peripheral side of the first connecting plate, and the temperature sensor is configured to monitor a temperature of the first connecting plate. The temperature sensor may be a thermistor, a thermocouple, or the like, and is configured to monitor the temperature of the first connecting plate, to prevent the inverter from heating or even catching fire due to poor contact caused by improper installation. In an implementation, the temperature sensor is located on a peripheral side of a position in which the first connecting plate is connected to the connection terminal.

In a possible implementation, the inverter further includes a second connector. The second connector includes a second housing and a second conductive core, the second housing is fastened to an outer side of the housing, the second conductive core is located in the second housing and extends into the inner side of the housing, the second conductive core includes a second connecting plate located on the inner side of the housing, the second connecting plate is of a flat structure, the second connecting plate is fastened to the circuit board and is electrically connected to a negative end of the inverter circuit, at least a part of an orthographic projection that is of the second connecting plate and that is on the circuit board is located on the circuit board, and the first connecting plate is electrically connected to a positive end of the inverter circuit.

The negative end of the inverter circuit is an end that is of the inverter circuit and that is connected to a negative end of the photovoltaic module, the positive end of the inverter circuit is an end that is of the inverter circuit and that is connected to a positive end of the photovoltaic module, and the inverter circuit and the photovoltaic module form a loop. A current flows from the positive end of the photovoltaic module to the positive end of the inverter circuit, the first connector is located between the positive end of the photovoltaic module and the positive end of the inverter circuit of the circuit board, and the second connector is located between the negative end of the photovoltaic module and the negative end of the inverter circuit of the circuit board.

In an implementation, processing such as stamping and rolling is performed at an end of a conductive core of an existing male connection component in the market, so that the end of the conductive core is of a flat structure, to produce the first connector. The processing such as the stamping and the rolling is performed at an end of a conductive core of an existing female connection component in the market, so that the end of the conductive core is of the flat structure, to produce the second connector. In an implementation, processing such as stamping and rolling is performed at an end of a conductive core of an existing female connection component in the market, so that the end of the conductive core is of a flat structure, to produce the first connector. The processing such as the stamping and the rolling is performed at an end of a conductive core of an existing male connection component in the market, so that the end of the conductive core is of the flat structure, to produce the second connector. The first connector and the second connector are obtained through direct and simple processing based on the existing male connection component and female connection component in the market, so that manufacturing processes of the first connector and the second connector are simpler and production costs are saved.

In an implementation, an opening is disposed on the second connecting plate, the inverter further includes a fastening member, and the fastening member passes through the opening and is fastened to the circuit board, to fasten the second connecting plate to the circuit board. The opening is disposed, so that a connection between the second connecting plate and the circuit board is simpler and more convenient.

In a possible implementation, an orthographic projection that is of the first connecting plate and that is on the circuit board does not overlap the orthographic projection that is of the second connecting plate and that is on the circuit board, so that the first connecting plate and the second connecting plate are staggered, which is conducive to installation of the first connector and the second connector on the circuit board, and can save installation space on the circuit board and distribute a plurality of connectors as densely as possible.

In an implementation, the first connecting plate and the second connecting plate are located on a same side of the circuit board in the first direction. In an implementation, the first connecting plate and the second connecting plate are respectively located on two sides of the circuit board in the first direction. In an implementation, the first connecting plate and the second connecting plate are located on two sides of the circuit board in the first direction, and the orthographic projection that is of the first connecting plate and that is on the circuit board at least partially overlap the orthographic projection that is of the second connecting plate and that is on the circuit board.

In a possible implementation, the inverter further includes a fastening base. The fastening base is located on the circuit board, a fastening groove is disposed in the fastening base, a connecting piece is disposed in the fastening groove, one end of the connecting piece is connected to the circuit board, the other end of the connecting piece is fastened and electrically connected to the second connecting plate, and the fastening base is configured to: improve stability of connections between a plurality of first connectors and a plurality of second connectors and the circuit board, and facilitate installation and a line connection of the inverter.

In an implementation, a height of the fastening base in the first direction is greater than a height of the connection terminal in the first direction. In an implementation, the second connector is directly electrically connected to the fastening base, and the first connector is electrically connected to the fastening base by using the connecting piece. A height of the fastening base in the first direction is greater than a height of the connection terminal in the first direction, so that the first connector and the second connector are staggered in the first direction. This helps save installation space on the circuit board.

In an implementation, a part of the first connector is directly electrically connected to the fastening base, and the other part of the first connector is electrically connected to the fastening base by using the connecting piece. A part of the second connector is directly electrically connected to the fastening base, and the other part of the second connector is electrically connected to the fastening base by using the connecting piece.

In a possible implementation, the inverter further includes a third connector. The third connector is located at an end that is of the first connector and that is away from the inverter, the third connector includes a third housing and a third conductive core, the third housing is fastened to the first housing, the third conductive core is electrically connected to the first conductive core, and the third connector is detachably connected to the first connector, to facilitate assembly and disassembly of the inverter. The third conductive core is located in the third housing and extends outside the third housing in a direction away from the first connector, the third conductive core and the first conductive core are electrically connected to the third housing or inside the first housing, and a part that is of the third conductive core and that is located outside the third housing is connected to the photovoltaic module through a cable.

In a possible implementation, the inverter further includes a fourth connector. The fourth connector is located at an end that is of the second connector and that is away from the inverter, the fourth connector includes a fourth housing and a fourth conductive core, the fourth housing is fastened to the second housing, and the fourth conductive core is electrically connected to the second conductive core. The fourth conductive core is located in the fourth housing and extends outside the fourth housing in a direction away from the second connector, the fourth conductive core and the second conductive core are electrically connected to the fourth housing or inside the second housing, and a part that is of the fourth conductive core and that is located outside the fourth housing is connected to the photovoltaic module through a cable. A design in which the fourth connector and the second connector are detachably connected facilitates assembly and disassembly of a photovoltaic system.

An implementation of this disclosure further provides an inverter. The inverter includes a housing, a first connector, and a socket, where a circuit board is disposed on an inner side of the housing, and an inverter circuit is disposed in the circuit board. The first connector includes a first housing and a first conductive core, where the first housing is fastened to the housing, the first conductive core is located in the first housing and extends into the inner side of the housing, the socket is located on the circuit board and is electrically connected to the circuit board, an end that is of the first conductive core and that is located on the inner side of the housing is inserted into the socket and is fastened to the socket, and the socket connects the first conductive core to the circuit board, to shorten a distance between the first conductive core and the circuit board.

An end that is of the first conductive core and that is away from a first connecting plate is configured to connect to a photovoltaic module, the first conductive core is configured to transmit, by using the first connecting plate, a direct current generated by the photovoltaic module to the inverter circuit, and the inverter circuit converts the direct current into an alternating current.

In an implementation, a shape of an end that is of the first conductive core and that is connected to the socket adapts to the socket. The end that is of the first conductive core and that is connected to the socket is of a flat structure. In another implementation, the end that is of the first conductive core and that is connected to the socket is in a cylindrical shape, a circular shape, a three-dimensional column shape, or the like, and an internal structure of the socket adapts to a shape of the first conductive core, so that the first conductive core is electrically connected to the socket.

According to a second aspect, an implementation of this disclosure provides a photovoltaic system. The photovoltaic system includes a photovoltaic module and the inverter according to any one of the foregoing, where the photovoltaic module is electrically connected to an end that is of the first connector and that is away from the circuit board, and a direct current generated by the photovoltaic module is transmitted to the inverter circuit by using the first connecting plate.

A filter circuit and a measurement circuit may be further disposed in the circuit board. After filtering and measurement processing are performed on the direct current of the photovoltaic module by the filter circuit and the measurement circuit, the direct current of the photovoltaic module is output as an alternating current by using the inverter circuit. The photovoltaic module includes a positive end and a negative end. Inside the photovoltaic module, a current flows from the negative end of the photovoltaic module to the positive end of the photovoltaic module, and both the positive end and the negative end of the photovoltaic module are connected to the circuit board. In an implementation, the first connector is disposed between the positive end of the photovoltaic module and the circuit board. In an implementation, the inverter further includes the second connector, and the second connector is connected between the negative end of the photovoltaic module and the circuit board. The photovoltaic module includes at least one photovoltaic panel, and the photovoltaic panel is connected to the circuit board. In an implementation, the photovoltaic module includes a plurality of photovoltaic panels that are connected in series, and direct currents of the plurality of photovoltaic panels are converged in a series connection manner and then connected to the inverter circuit in the circuit board by using the first connector.

In an implementation, the first connector may alternatively be disposed between the negative end of the photovoltaic module and the circuit board. In an implementation, the inverter includes two first connectors. One of the first connectors is configured to be connected to a positive end of the circuit board, and the other of the first connectors is configured to be connected to a negative end of the circuit board. In other words, the first connector is disposed between the positive end of the photovoltaic module and the circuit board, and between the negative end of the photovoltaic module and the circuit board, and the photovoltaic module and the first connector may be electrically connected through a cable.

In this disclosure, the first connecting plate in the first connector is disposed as the flat structure, and the first connecting plate is directly connected to the circuit board. In one aspect, the connection between the first connector and the circuit board is more convenient, and the installation of the inverter is simpler and more efficient. In another aspect, the first connector is connected to the circuit board without the cable, so that the contact resistance and the generated heat between the first connector and the circuit board are reduced, and the work efficiency of the inverter is improved. In addition, the impact of the poor contact between the first connector and the circuit board can be reduced in the processing, transportation, and assembly processes, and the risk of the excessive heat generation or even the fire caused by the long-term connection between the first connector and the circuit board is reduced. In yet another aspect, the distance between the first connecting plate and the circuit board is shortened, so that the space at the connection joint between the first connecting plate and the circuit board is saved, the space utilization and the power density of the inverter are improved, the length of the photovoltaic input path is effectively shortened, and the interference caused by the environment to the photovoltaic input is reduced.

BRIEF DESCRIPTION OF DRAWINGS

To describe technical solutions in embodiments of this disclosure more clearly, the following describes accompanying drawings used in describing embodiments of this disclosure.

DESCRIPTION OF EMBODIMENTS

The following describes technical solutions in embodiments of this disclosure with reference to accompanying drawings in embodiments of this disclosure. It is clear that the described embodiments are merely a part rather than all of embodiments of this disclosure.

In this specification, terms “first”, “second”, and the like are merely used for a purpose of description, and shall not be understood as an indication or implication of relative importance or implicit indication of a quantity of indicated technical features. Therefore, a feature limited by “first” or “second” may explicitly or implicitly include one or more features. In the descriptions of this disclosure, unless otherwise stated, “a plurality of” means two or more.

In addition, in this specification, position terms such as “top” and “bottom” are defined relative to positions of structures in the accompanying drawings. It should be understood that these position terms are relative concepts used for relative description and clarification, and may correspondingly change according to changes in the positions of the structures.

For ease of understanding, the following first explains and describes English abbreviations and related technical terms in embodiments of this disclosure.

Inverter: is a converter that converts a direct current into a constant-frequency constant-voltage alternating current or a frequency-modulation voltage-regulation alternating current. In this implementation, a function of the inverter is to convert a direct current generated by a solar cell panel (also referred to as a photovoltaic panel) into an alternating current.

MC4 connector: MC is short for Multi-Contact, and 4 indicates a diameter of a metal core. Multi-Contact is a Switzerland company. The MC4 connector is configured to connect important components for photovoltaic power generation such as a photovoltaic module, a combiner box, and an inverter.

Figure 1:
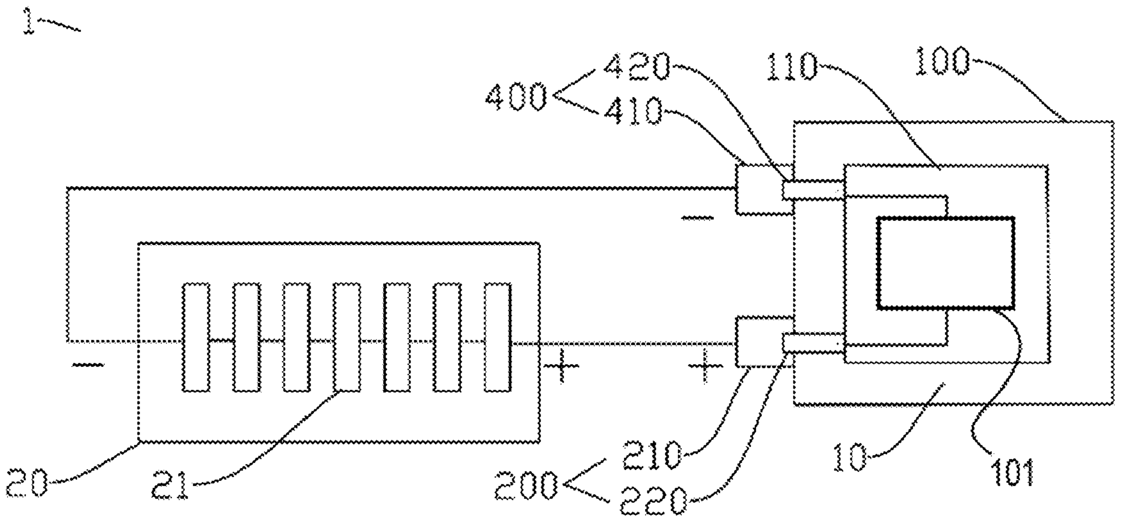
FIG. 1 is a schematic diagram of a structure of a photovoltaic system according to an implementation of this disclosure.

FIG. 1 is a schematic diagram of a photovoltaic system 1 according to an implementation of this disclosure. The photovoltaic system 1 includes an inverter 10 and a photovoltaic module 20. The inverter 10 includes a housing 100 and a first connector 200, a circuit board 110 is disposed on an inner side of the housing 100, an inverter circuit 101 is disposed on the circuit board 110, and the photovoltaic module 20 is electrically connected to an end that is of the first connector 200 and that is away from the circuit board 110. The circuit board 110 may be an entire circuit block, or may include a plurality of circuit subboards. The plurality of circuit subboards are spliced into the circuit board 110. A function of each circuit subboard may be set based on a requirement, and the first connector 200 may be connected to one of the circuit subboards.

The inverter circuit 101 is configured to: perform inversion processing on a direct current of the photovoltaic module 20 and output the direct current as an alternating current. A filter circuit and a measurement circuit may be further disposed in the circuit board 110. After filtering and measurement processing are performed on the direct current of the photovoltaic module 20 by the filter circuit and the measurement circuit, the direct current of the photovoltaic module 20 is output as the alternating current by using the inverter circuit 101. The photovoltaic module 20 includes a positive end and a negative end. Inside the photovoltaic module 20, the current flows from the negative end of the photovoltaic module 20 to the positive end of the photovoltaic module 20, and both the positive end and the negative end of the photovoltaic module 20 are connected to the circuit board 110. In an implementation, the first connector 200 is disposed between the positive end of the photovoltaic module 20 and the circuit board 110. In an implementation, the inverter 10 further includes a second connector 400, and the second connector 400 is connected between the negative end of the photovoltaic module 20 and the circuit board 110.

In an implementation, the first connector 200 may alternatively be disposed between the negative end of the photovoltaic module 20 and the circuit board 110. In an implementation, the inverter 10 includes two first connectors 200. One of the first connectors 200 is configured to be connected to a positive end of the circuit board 110, and the other of the first connectors 200 is configured to be connected to a negative end of the circuit board 110. In other words, the first connector 200 is disposed between the positive end of the photovoltaic module 20 and the circuit board 110, and between the negative end of the photovoltaic module 20 and the circuit board 110. The photovoltaic module 20 may be electrically connected to the first connector 200 through a cable.

The photovoltaic module 20 includes at least one photovoltaic panel 21, and the photovoltaic panel 21 is connected to the circuit board 110. In an implementation, the photovoltaic module 20 includes a plurality of photovoltaic panels 21 that are connected in series, and direct currents of the plurality of photovoltaic panels 21 are converged in a series connection manner and then connected to the inverter circuit 101 in the circuit board 110 by using the first connector 200.

Figure 2:
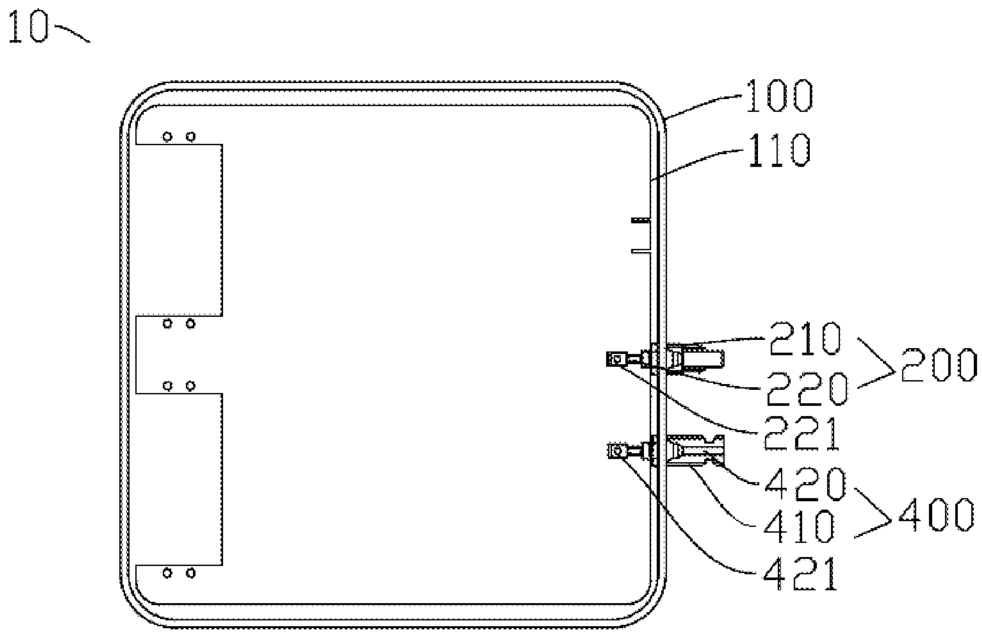
FIG. 2 is a schematic diagram of a structure of an inverter according to an implementation of this disclosure.
Figure 3:
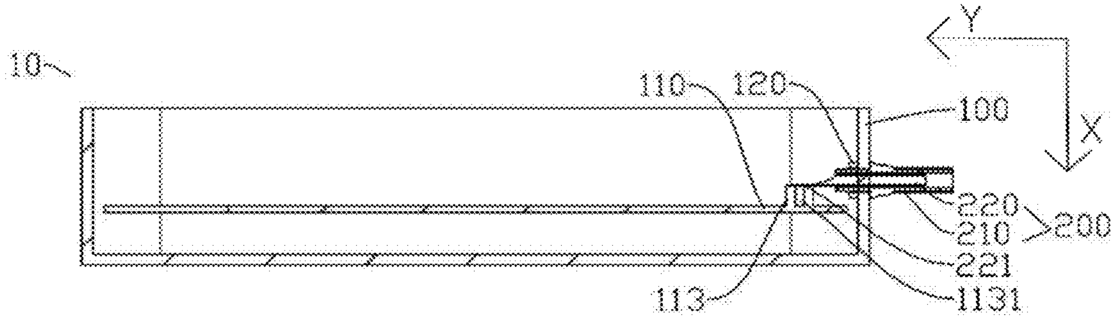
FIG. 3 is a schematic diagram of a structure of a first conductive core according to an implementation of this disclosure.

Refer to FIG. 2 and FIG. 3. FIG. 2 is a schematic diagram of an inverter 10 according to an implementation of this disclosure. FIG. 3 is a cross-sectional view of the inverter 10 in FIG. 2. The inverter 10 includes a housing 100 and a first connector 200, a circuit board 110 is disposed on an inner side of the housing 100, and an inverter circuit (not shown in the figure) is disposed in the circuit board 110. The first connector 200 includes a first housing 210 and a first conductive core 220, the first housing 210 is fastened to the housing 100, and the first conductive core 220 is located in the first housing 210 and extends into the inner side of the housing 100. The first conductive core 220 includes a first connecting plate 221 located on the inner side of the housing 100, the first connecting plate 221 is of a flat structure, and the first connecting plate 221 is fastened to the circuit board 110 and is electrically connected to the inverter circuit. An end that is of the first conductive core 220 and that is away from the first connecting plate 221 is configured to connect to a photovoltaic module 20, the first conductive core 220 is configured to transmit, by using the first connecting plate 221, a direct current generated by the photovoltaic module 20 to the inverter circuit, the inverter circuit converts the direct current into an alternating current, and the flat structure of the first connecting plate 221 is configured to improve connection stability and current transmission stability when the first connecting plate 221 is fastened to the circuit board 110.

The first housing 210 in the first connector 200 is configured to protect the first conductive core 220, and is configured to fasten the first conductive core 220 to the housing 100. The first conductive core 220 in the first connector 200 is configured to: transmit electricity, and transmit the direct current in the photovoltaic module 20 to the inverter circuit in the circuit board 110, to convert the direct current into the alternating current.

Figure 4:
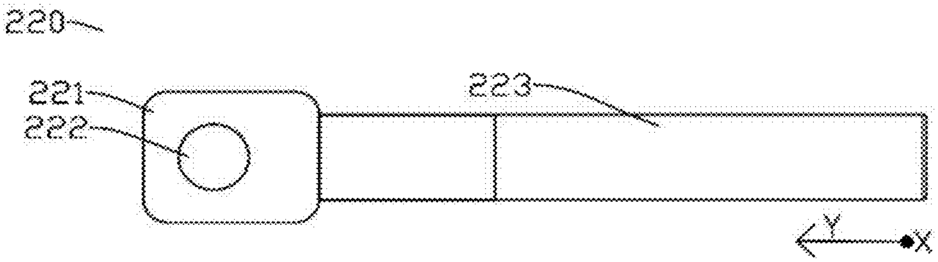
FIG. 4 is a schematic diagram of a structure of a first conductive core according to an implementation of this disclosure.
Figure 5:
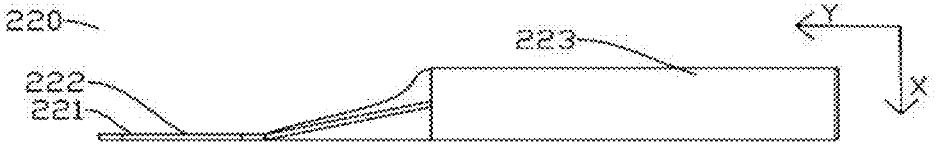
FIG. 5 is a schematic diagram of a structure of a first conductive core according to an implementation of this disclosure.

Refer to FIG. 4 and FIG. 5. FIG. 4 is a top view of the first conductive core 220, and FIG. 5 is a side view of the first conductive core 220. In this implementation, the first conductive core 220 is in a straight strip shape, and the part that is of the first conductive core 220 and that is away from the first connecting plate 221 is in a hollow cylindrical shape. The first connecting plate 221 is of the flat structure, which can increase a contact area between the first connecting plate 221 and the circuit board, to facilitate fastening of the first connecting plate 221 to the circuit board 110, ensure good electrical connectivity between the first connecting plate 221 and the circuit board 110, and improve the connection stability and electrical transmission stability. In an implementation, the first connecting plate 221 is welded on the circuit board 110. Because the first connecting plate 221 is of the flat structure, the first connecting plate 221 and the circuit board 110 each have a large welding area, thereby providing welding stability. In an implementation, a plane on which the first connecting plate 221 is located is parallel to a board surface of the circuit board 110, thereby improving stability and reliability of the connection between the first connecting plate 221 and the circuit board 110.

In a possible implementation, the first connecting plate 221 and the circuit board 110 are stacked in a first direction X, and at least a part of an orthographic projection that is of the first connecting plate 221 and that is on the circuit board 110 in the first direction X is located on the circuit board 110. In this implementation, the first connecting plate 221 and the circuit board 110 are stacked in the first direction X, so that at least a part of the orthographic projection that is of the first connecting plate 221 and that is on the circuit board 110 is located on the circuit board 110. This disposition enables the first connecting plate 221 and the circuit board 110 to have a partial intersection in a second direction Y, to shorten a distance between the first connecting plate 221 and the circuit board 110, and enable the first connecting plate 221 to be directly connected to the circuit board 110 in the second direction Y, and a cable does not need to be disposed between the circuit board 110 and the first connecting plate 221 in the second direction Y. In addition, the distance between the first connecting plate 221 and the circuit board 110 is shortened, so that a current output from the first connecting plate 221 can be directly input to the circuit board 110, thereby effectively shortening a length of a current input path of the inverter 10 and reducing interference caused by an environment to the current input of the inverter 10.

The first direction X intersects with the second direction Y. In this implementation, the first direction X is a thickness direction of the inverter 10, the second direction Y is a width direction of the inverter 10, and the first direction X is perpendicular to the second direction Y.

In an implementation, the orthographic projection that is of the first connecting plate 221 and that is on the circuit board 110 may be located outside the circuit board 110, and the first connecting plate 221 may be connected to the circuit board 110 by using a connection component.

In an implementation, the first connecting plate 221 is formed by stretching an end of the first conductive core 220, which can save preparation costs. In an implementation, the first conductive core 220 is formed through integral machining or integrated injection molding.

Figure 10:
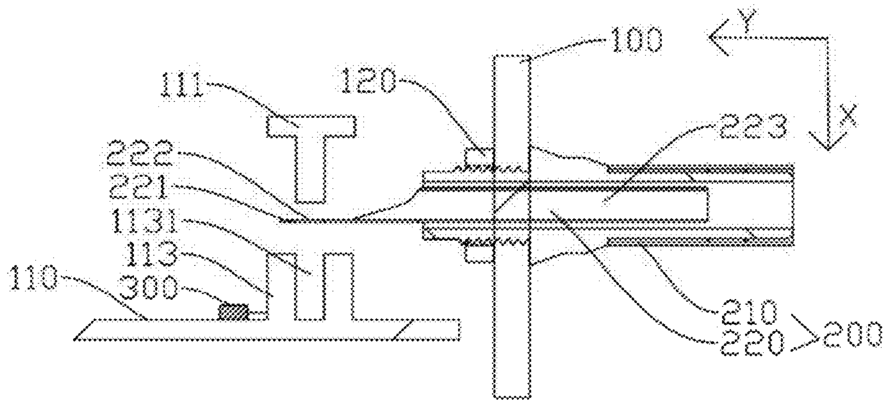
FIG. 10 is a schematic diagram of a partial structure of an inverter according to an implementation of this disclosure.

The first housing 210 is fastened to the housing 100 by using screws, through welding, or the like. FIG. 10 is an enlarged layout diagram of the first connector 200 and a surrounding part of the first connector 200 in the inverter 10. In this implementation, the first housing 210 extends to the inner side of the housing 100, and the first housing 210 is fastened to the housing 100 by using a screw nut 120. The first housing 210 wraps a part that is of the first conductive core 220 and that is located on an outer side the housing 100, and the first conductive core 220 is fastened to the housing 100 by being fastened to the first housing 210.

An existing MC4 or imitated MC4 connector in the market includes a male connection component and a female connection component that are detachably connected. An end that is of the male connection component and that is away from the female connection component is connected to the circuit board 110, and an end that is of the female connection component and that is away from the male connection component is connected to the photovoltaic module 20. Alternatively, an end that is of the female connection component and that is away from the male connection component is connected to the circuit board 110, and an end that is of the male connection component and that is away from the female connection component is connected to the photovoltaic module 20. In an implementation, processing such as stamping and rolling is performed at an end of a conductive core of the existing male connection component or female connection component in the market, so that the end of the conductive core is of a flat structure, to produce the first connector 200.

In another technology, the MC4 or the imitated MC4 connector is directly connected to the circuit board 110 through a cable. Because internal space of the inverter 10 is limited, a bending radius of the cable fails to meet a standard, and internal cables of the inverter 10 are messy, which leads to difficult installation and low installation efficiency of the inverter 10 and an improper connection problem. Especially when the photovoltaic system 1 has a plurality of photovoltaic modules 20, and when the inverter 10 is connected to a plurality of MC4 or imitated MC4 connectors of the plurality of photovoltaic modules 20, more cables are required inside the inverter 10 to connect the MC4 or the imitated MC4 connectors to the circuit board 110, so that the cables inside the inverter 10 are messier, and the installation of the inverter 10 is more difficult. In addition, both ends of the cable need OTs to be respectively connected to the circuit board and the MC4 connector, so that a contact resistance and generated heat of an entire loop are high, and efficiency of the entire inverter is reduced.

In this disclosure, the first connecting plate 221 in the first connector 200 is disposed as the flat structure, and the first connecting plate 221 may be directly connected to the circuit board 110. In one aspect, the connection between the first connector 200 and the circuit board 110 is more convenient, and the installation of the inverter 10 is simpler and more efficient. In another aspect, the first connector 200 is connected to the circuit board 110 without the cable, so that a contact resistance and generated heat between the first connector 200 and the circuit board 110 are reduced, and work efficiency of the inverter 10 is improved. In addition, impact of poor contact between the first connector 200 and the circuit board 110 can be reduced in processing, transportation, and assembly processes, and a risk of excessive heat generation or even fire caused by a long-term connection between the first connector 200 and the circuit board 110 is reduced. In yet another aspect, the distance between the first connecting plate 221 and the circuit board 110 is shortened, so that space at a connection joint between the first connecting plate 221 and the circuit board 110 is saved, space utilization and power density of the inverter 10 are improved, a length of a photovoltaic input path is effectively shortened, and interference caused by the environment to the photovoltaic input is reduced.

With reference to FIG. 4 and FIG. 10, in a possible implementation, an opening 222 (as shown in FIG. 4) is disposed on the first connecting plate 221, the inverter 10 further includes a fastening member 111 (as shown in FIG. 10), and the fastening member 111 passes through the opening 222 and is fastened to the circuit board 110, to fasten the first connecting plate 221 to the circuit board 110. The opening 222 is disposed, so that the connection between the first connecting plate 221 and the circuit board 110 is simpler and more convenient.

Figure 6:
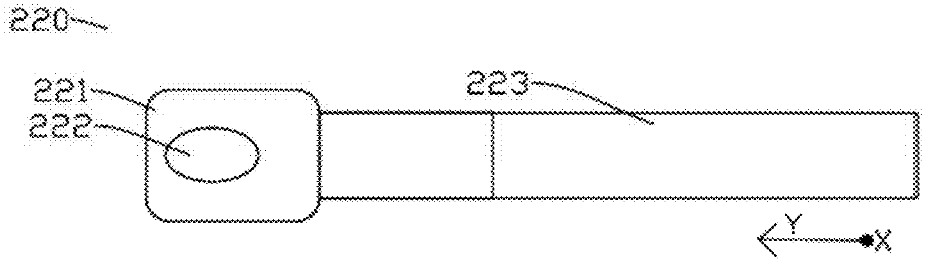
FIG. 6 is a schematic diagram of a structure of a first conductive core according to an implementation of this disclosure.
Figure 7:
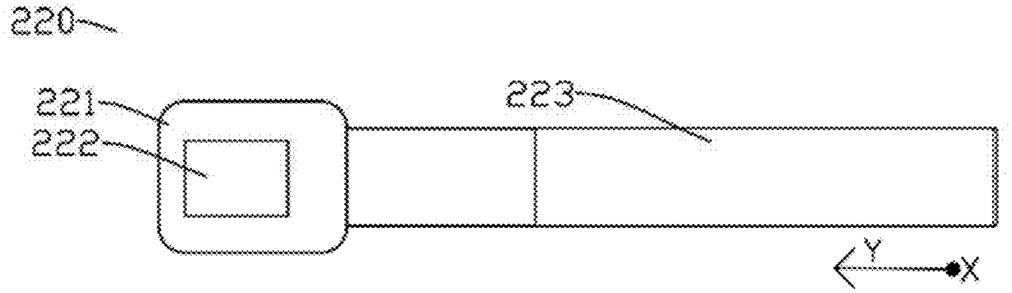
FIG. 7 is a schematic diagram of a structure of a first conductive core according to an implementation of this disclosure.
Figure 8:
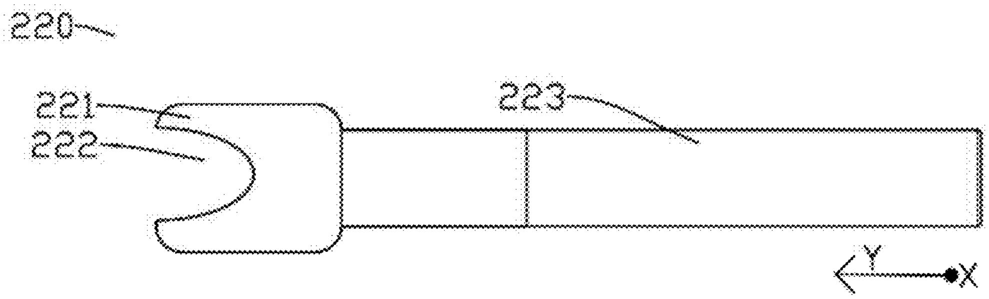
FIG. 8 is a schematic diagram of a structure of a first conductive core according to an implementation of this disclosure.
Figure 9:
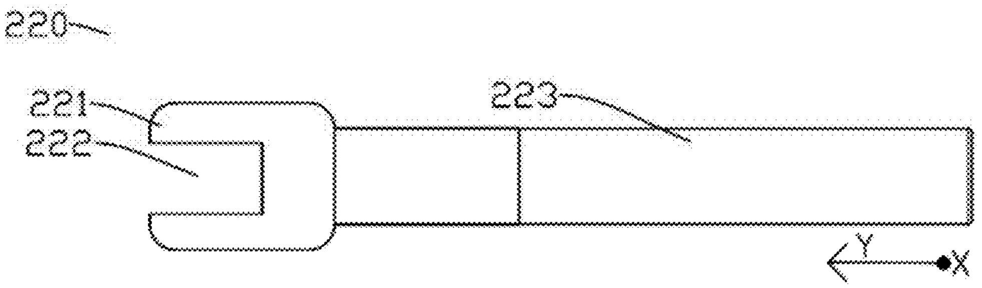
FIG. 9 is a schematic diagram of a structure of a first conductive core according to an implementation of this disclosure.

In an implementation, a shape of the opening 222 may be a round hole (as shown in FIG. 4), an elliptical hole (as shown in FIG. 6), a square hole (as shown in FIG. 7), a U-shaped notch (as shown in FIG. 8 and FIG. 9), or any other suitable shape. In an implementation, the fastening member 111 may be a screw, a snap-fit, or the like.

Figure 11:
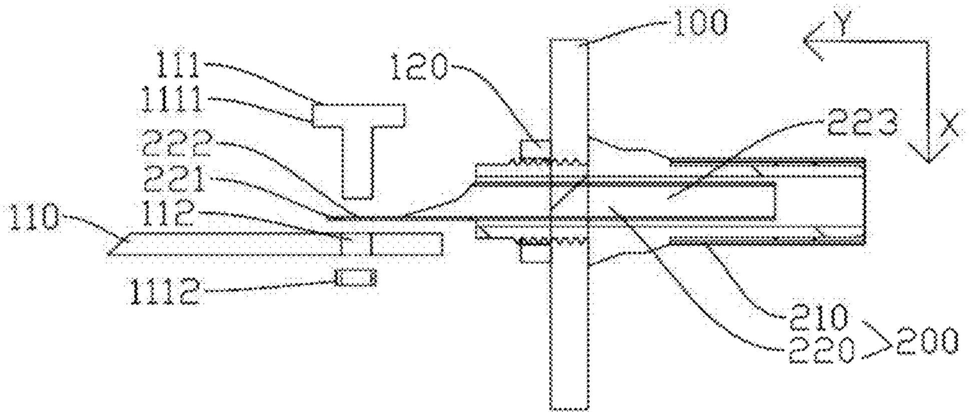
FIG. 11 is a schematic diagram of a partial structure of an inverter according to an implementation of this disclosure.

Refer to FIG. 11. In an implementation, the shape of the opening 222 is the round hole, the fastening member 111 is a screw bolt 1111 and a screw nut 1112 that are matched, and a hole 112 that penetrates the circuit board 110 is disposed on the circuit board 110. The screw bolt 1111 sequentially passes through the opening 222, the hole 112, and the screw nut 1112, to fasten the first connecting plate 221 to the circuit board 110.

In a possible implementation, a connection terminal 113 (as shown in FIG. 10) is disposed on the circuit board 110, the first connecting plate 221, the connection terminal 113, and the circuit board 110 are sequentially stacked, and the connection terminal 113 is connected to the first connecting plate 221 and the circuit board 110. The first connecting plate 221, the connection terminal 113, and the circuit board 110 are sequentially stacked in the first direction X, the first direction X is perpendicular to the circuit board 110, the connection terminal 113 is fastened to the circuit board 110 and is electrically connected to the circuit board 110, a pore channel 1131 is disposed at the connection terminal 113, and the opening 222 is disposed on the first connecting plate 221. The inverter 10 further includes the fastening member 111, and the fastening member 111 passes through the opening 222 in the first direction X and extends into the pore channel 1131, to fasten the first connecting plate 221 to the connection terminal 113. The connection terminal 113 is disposed, so that the connection between the first connecting plate 221 and the circuit board 110 is simpler and more convenient. In an implementation, a screw thread is disposed in the pore channel 1131, the fastening member 111 is the screw, and the screw and the screw thread cooperate with each other, so that the first connecting plate 221 can be more reliably fastened to the connection terminal 113.

Figure 12:
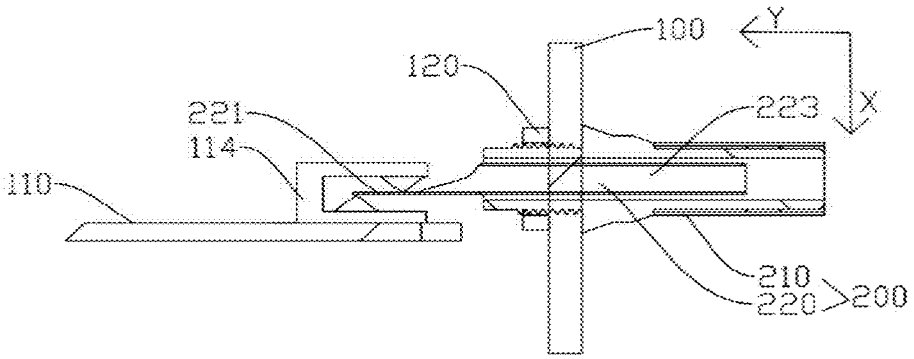
FIG. 12 is a schematic diagram of a partial structure of an inverter according to an implementation of this disclosure.

In an implementation, a socket 114 (as shown in FIG. 12) is disposed on the circuit board 110, the socket 114 is electrically connected to the circuit board 110, the first connecting plate 221 is inserted into the socket 114 and is electrically connected to the socket 114, and further, the first connecting plate 221 is electrically connected to the circuit board 110. An internal structure of the socket 114 is not limited to the structure shown in FIG. 12, provided that when the first connecting plate 221 is inserted into the socket 114, the first connecting plate 221 can be fastened to the socket 114 and be electrically connected to the socket 114.

Still refer to FIG. 4. In a possible implementation, the first conductive core 220 includes a first conductive core body 223 and the first connecting plate 221, the first conductive core body 223 passes through the outer side and the inner side of the housing 100, the first connecting plate 221 is located at an end of the first conductive core body 223, and an extension direction of the first connecting plate 221 is the same as an extension direction of the first conductive core body 223. The extension direction of the first conductive core body 223 is the second direction Y, and the second direction Y intersects with the first direction X. In this implementation, the second direction Y perpendicularly intersects with the first direction X. The first conductive core 220 is in a linear shape, which is easy to process.

Figure 13:
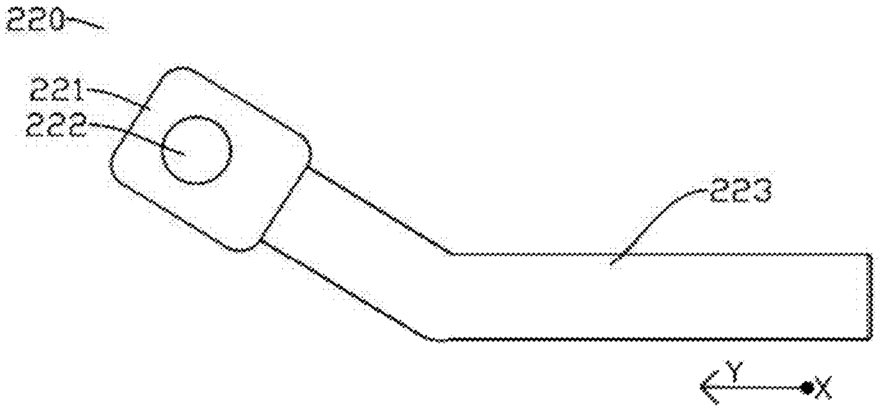
FIG. 13 is a schematic diagram of a structure of a first conductive core according to an implementation of this disclosure.

Still refer to FIG. 13. In a possible implementation, the first conductive core 220 includes the first conductive core body 223 and the first connecting plate 221, the first conductive core body 223 passes through the outer side and the inner side of the housing 100, the first connecting plate 221 is located at an end of the first conductive core body 223, and the extension direction of the first connecting plate 221 intersects with the extension direction of the first conductive core body 223. In an implementation, the first connecting plate 221 is in the linear shape, and an included angle between the first connecting plate 221 and the first conductive core body 223 is greater than 0° and less than 180°, so that the first connector 200 can adapt to different installation environments. In an implementation, the first connecting plate 221 is in an arc shape.

Figure 14:
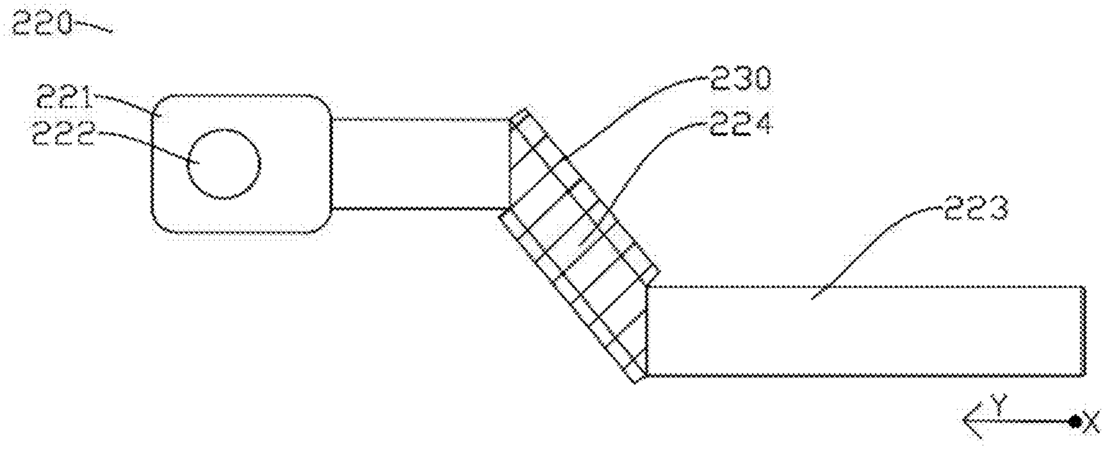
FIG. 14 is a schematic diagram of a structure of a first conductive core according to an implementation of this disclosure.
Figure 15:
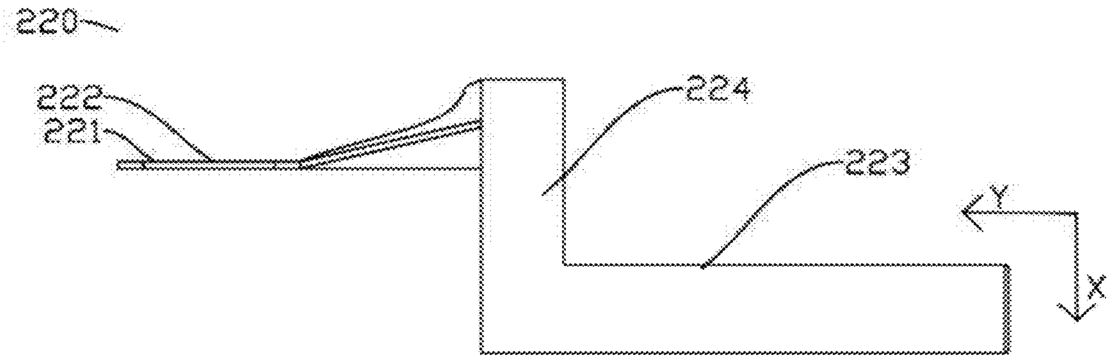
FIG. 15 is a schematic diagram of a structure of a first conductive core according to an implementation of this disclosure.

Refer to FIG. 14 and FIG. 15. In a possible implementation, the first conductive core 220 further includes a first connection section 224, the first connection section 224 is located between the first conductive core body 223 and the first connecting plate 221, and an extension direction of the first connection section 224 intersects with both the extension direction of the first conductive core body 223 and the extension direction of the first connecting plate 221. An included angle between the first connection section 224 and the first conductive core body 223 is greater than 0° and less than 180°, and an included angle between the first connection section 224 and the first connecting plate 221 is greater than 0° and less than 180°. The first conductive core 220 is in a "Z" shape, so that the first connector 200 can adapt to the different installation environments.

Figure 16:
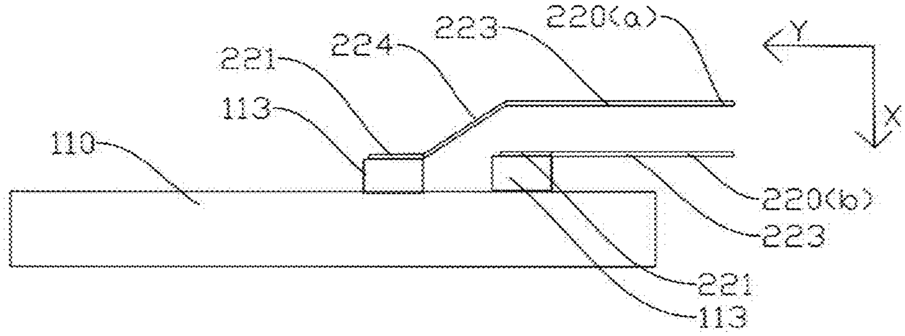
FIG. 16 is a schematic diagram of a structure of a first conductive core according to an implementation of this disclosure.

In an implementation, the first conductive core 220 (*a*) is in the "Z" shape (as shown in FIG. 16), the first conductive core 220 (*b*) is in the linear shape, and the first conductive core 220 (*a*) and the first conductive core 220 (*b*) are staggered, which save space of the inverter 10.

Still refer to FIG. 14. In a possible implementation, the first connector 200 further includes an insulation part 230, and the insulation part 230 covers an outer surface of the first connection section 224. Although the first connection section 224 can improve installation flexibility of the first conductive core 220, the first connection section 224 also increases a length of the first conductive core 220, and in some cases, a short circuit may occur when a conductive part falls on the first connection section 224. The first connection section 224 is insulated and isolated from an external environment by the insulation part 230, thereby reducing a risk of a short circuit occurring in the first connection section 224 and improving security of the first connector 200.

In a possible implementation, the first conductive core body 223 and the first connecting plate 221 are of an integrated structure. The integrated structure has higher strength, which enhances connection strength between the first conductive core body 223 and the first connecting plate 221, and prolongs a service life of the first connector 200.

In a possible implementation, the inverter 10 further includes a temperature sensor 300 (as shown in FIG. 10), and the temperature sensor 300 is located on the circuit board 110 and is located on a peripheral side of the first connecting plate 221. The temperature sensor may be a thermistor, a thermocouple, or the like, and is configured to monitor a temperature of the first connecting plate 221, to prevent the inverter 10 from heating or even catching fire due to poor contact caused by improper installation. In an implementation, the temperature sensor 300 is located on a peripheral side of a position in which the first connecting plate 221 is connected to the connection terminal 113.

Figure 17:
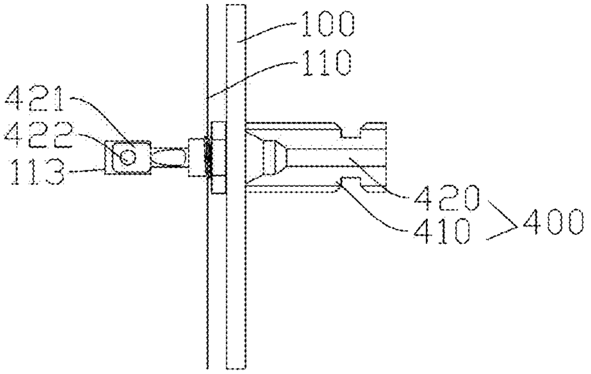
FIG. 17 is a schematic diagram of a partial structure of an inverter according to an implementation of this disclosure.

With reference to FIG. 2 and FIG. 17. FIG. 17 is a schematic diagram of a structure in which the second connector 400 is installed on the housing 100. In a possible implementation, the inverter 10 further includes the second connector 400. The second connector 400 includes a second housing 410 and a second conductive core 420, the second housing 410 is fastened to the outer side of the housing 100, the second conductive core 420 is located in the second housing 410 and extends into the inner side of the housing 100, the second conductive core 420 includes a second connecting plate 421 located on the inner side of the housing 100, the second connecting plate 421 is of the flat structure, the second connecting plate 421 is fastened to the circuit board 110 and is electrically connected to a negative end of the inverter circuit, at least a part of an orthographic projection that is of the second connecting plate 421 and that is on the circuit board 110 is located on the circuit board 110, and the first connecting plate 221 is electrically connected to a positive end of the inverter circuit.

With reference to FIG. 1, the negative end of the inverter circuit is an end that is of the inverter circuit and that is connected to the negative end of the photovoltaic module 20, the positive end of the inverter circuit is an end that is of the inverter circuit and that is connected to the positive end of the photovoltaic module 20, and the inverter circuit and the photovoltaic module 20 form a loop. A current flows from the positive end of the photovoltaic module 20 to the positive end of the inverter circuit, the first connector 200 is located between the positive end of the photovoltaic module 20 and the positive end of the inverter circuit of the circuit board 110, and the second connector 400 is located between the negative end of the photovoltaic module 20 and the negative end of the inverter circuit of the circuit board 110. In an implementation, the processing such as the stamping and the rolling is performed at an end of the conductive core of the existing male connection component in the market, so that the end of the conductive core is of the flat structure, to produce the first connector 200. The processing such as the stamping and the rolling is performed at an end of the conductive core of the existing female connection component in the market, so that the end of the conductive core is of the flat structure, to produce the second connector 400. In an implementation, the processing such as the stamping and the rolling is performed at an end of the conductive core of the existing female connection component in the market, so that the end of the conductive core is of the flat structure, to produce the first connector 200. The processing such as the stamping and the rolling is performed at an end of the conductive core of the existing male connection component in the market, so that the end of the conductive core is of the flat structure, to produce the second connector 400. The first connector 200 and the second connector 400 are obtained through direct and simple processing based on the existing male connection component and female connection component in the market, so that manufacturing processes of the first connector 200 and the second connector 400 are simpler and production costs are saved.

Figure 18:
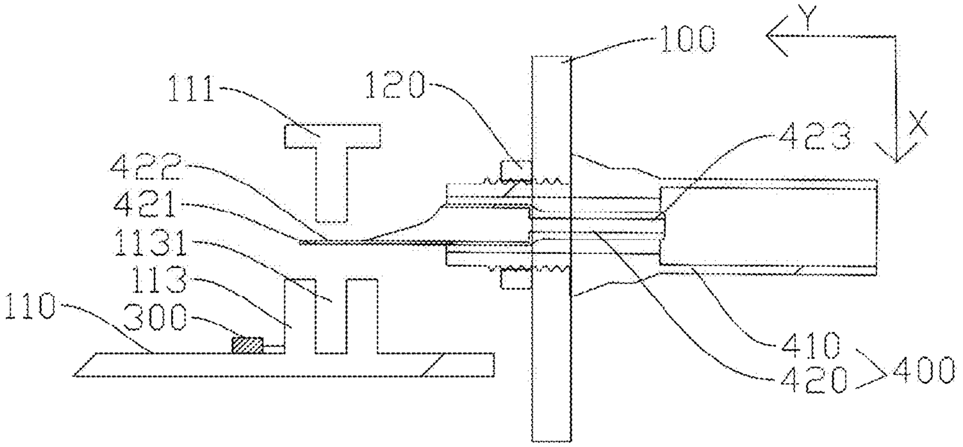
FIG. 18 is a schematic diagram of a partial structure of an inverter according to an implementation of this disclosure.

In an implementation, an opening 422 is disposed on the second connecting plate 421, the inverter 10 further includes the fastening member 111 (as shown in FIG. 18), and the fastening member 111 passes through the opening 422 and is fastened to the circuit board 110, to fasten the second connecting plate 421 to the circuit board 110. The opening 422 is disposed, so that the connection between the second connecting plate 421 and the circuit board 110 is simpler and more convenient.

In a possible implementation, the orthographic projection that is of the first connecting plate 221 and that is on the circuit board 110 does not overlap the orthographic projection that is of the second connecting plate 421 and that is on the circuit board 110 (as shown in FIG. 2). The first connecting plate 221 and the second connecting plate 421 are staggered, which is conducive to installation of the first connector and the second connector on the circuit board 110, and can save installation space on the circuit board 110 and distribute a plurality of connectors as densely as possible.

In an implementation, the first connecting plate 221 and the second connecting plate 421 are located on a same side of the circuit board 110 in the first direction X (as shown in FIG. 2).

Figure 19:
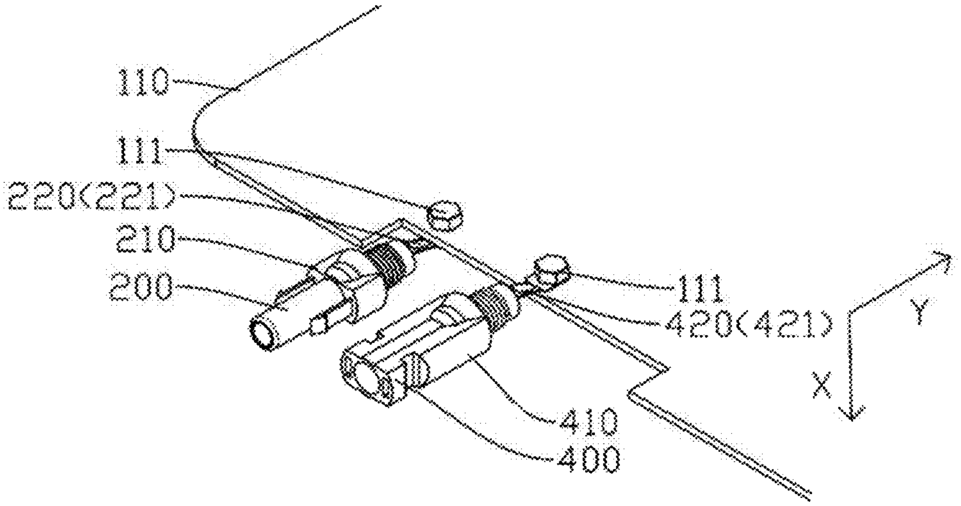
FIG. 19 is a schematic diagram of a partial structure of an inverter according to an implementation of this disclosure.

In an implementation, the first connecting plate 221 and the second connecting plate 421 are respectively located on two sides of the circuit board 110 in the first direction X (as shown in FIG. 19). In an implementation, the first connecting plate 221 and the second connecting plate 421 are located on the two sides of the circuit board 110 in the first direction X, and the orthographic projection that is of the first connecting plate 221 and that is on the circuit board 110 at least partially overlap the orthographic projection that is of the second connecting plate 421 and that is on the circuit board 110.

Figure 20:
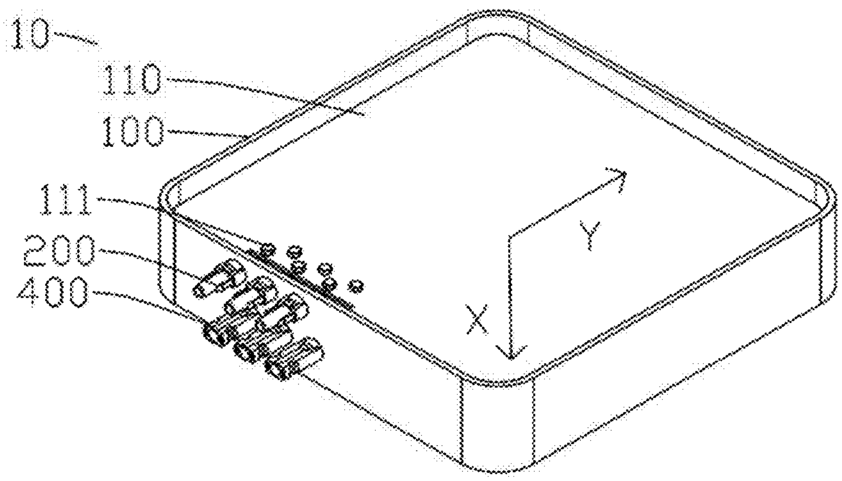
FIG. 20 is a schematic diagram of a structure of an inverter according to an implementation of this disclosure.
Figure 21:
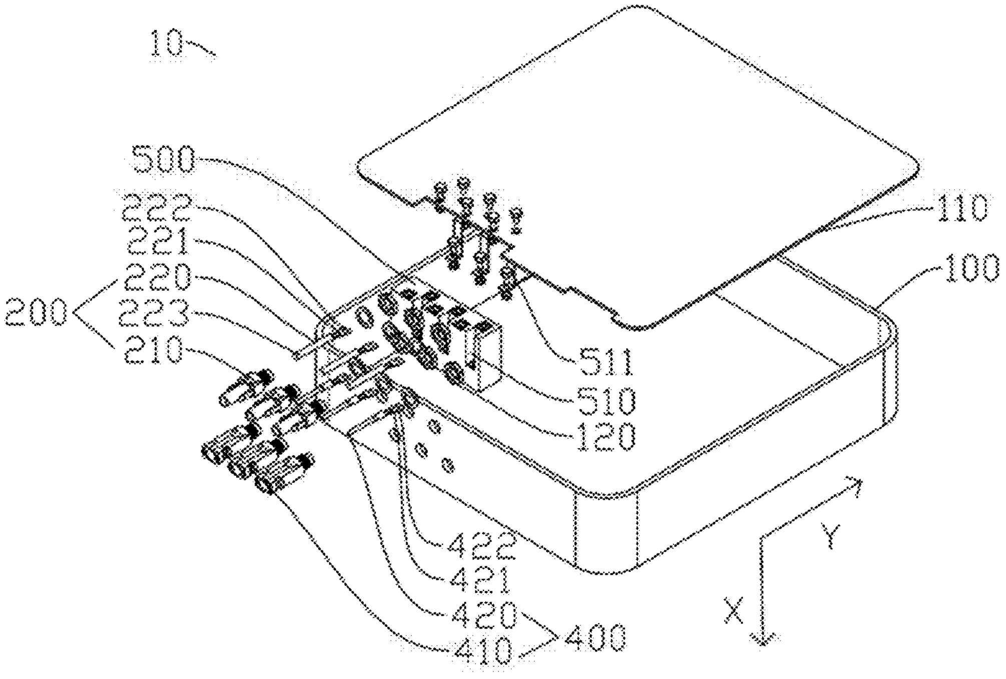
FIG. 21 is an exploded diagram of an inverter according to an implementation of this disclosure.

Refer to FIG. 20 and FIG. 21. FIG. 20 is a schematic diagram of an inverter according to another implementation of this disclosure. FIG. 21 is an exploded diagram of the inverter in FIG. 20. In a possible implementation, the inverter 10 further includes a fastening base 500 (as shown in FIG. 21). The fastening base 500 is located on the circuit board 110, a fastening groove 510 is disposed in the fastening base 500, a connecting piece 511 is disposed in the fastening groove 510, one end of the connecting piece 511 is connected to the circuit board 110, and the other end of the connecting piece 511 is fastened and electrically connected to the second connecting plate 421. The fastening base 500 is located on the inner side of the housing 100, and the fastening base 500 is located on a side that is of the circuit board 110 and that is close to the first connector 200. In this implementation, the first connector 200 is directly electrically connected to the fastening base 500, and the second connector 400 is electrically connected to the fastening base 500 by using the connecting piece 511. The fastening base 500 is disposed, so that in one aspect, a plurality of first connectors 200 and a plurality of second connectors 400 are fastened together, thereby improving connection stability between the plurality of first connectors 200 and the circuit board 110 and between the plurality of second connectors 400 and the circuit board 110, and in another aspect, lines are reasonably planned and arranged by using the fastening base 500, which is more conducive to installation and a line connection of the inverter 10. The connecting piece 511 is disposed, so that compared with the first connector 200, the second connector 400 is disposed farther away from the circuit board 110 in the first direction X, and the second connector 400 and the first connector 200 are in staggered positions. This helps save the installation space on the circuit board 110 and distribute the plurality of second connectors 400 and first connectors 200 as densely as possible.

In an implementation, a height of the fastening base 500 in the first direction X is greater than a height of the connection terminal 113 in the first direction X. In an implementation, the second connector 400 is directly electrically connected to the fastening base 500, and the first connector 200 is electrically connected to the fastening base 500 by using the connecting piece 511. The height of the fastening base 500 in the first direction X is greater than the height of the connection terminal 113 in the first direction X, so that the first connector 200 and the second connector 400 are staggered in the first direction X. This helps save the installation space on the circuit board 110.

In an implementation, a part of the first connector 200 is directly electrically connected to the fastening base 500, and the other part of the first connector 200 is electrically connected to the fastening base 500 by using the connecting piece 511. A part of the second connector 400 is directly electrically connected to the fastening base 500, and the other part of the second connector 400 is electrically connected to the fastening base 500 by using the connecting piece 511.

Figure 22:
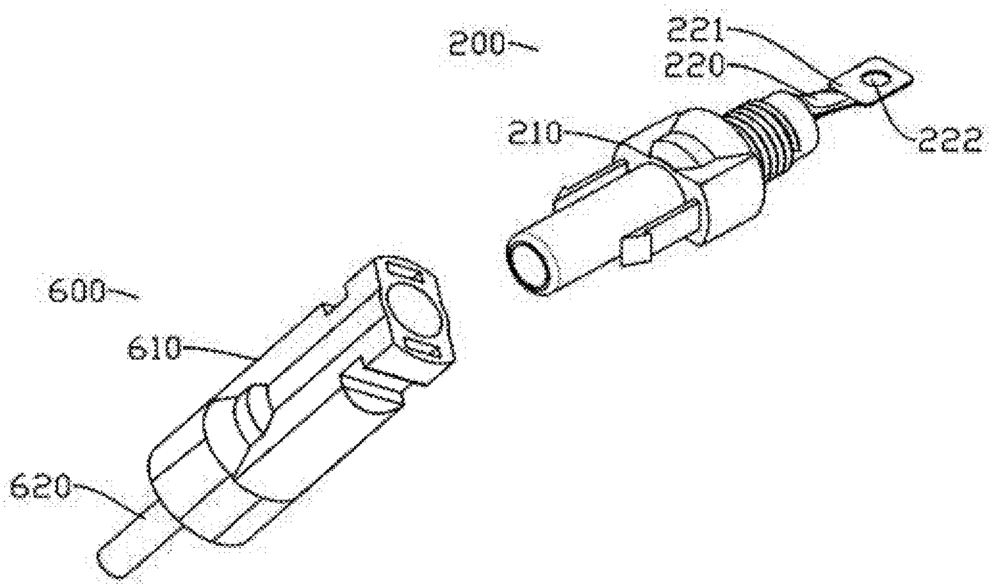
FIG. 22 is a schematic diagram of structures of a first connector and a third connector according to an implementation of this disclosure.

In a possible implementation, the inverter 10 further includes a third connector 600 (as shown in FIG. 22). The third connector 600 is located at an end that is of the first connector 200 and that is away from the inverter 10, the third connector 600 includes a third housing 610 and a third conductive core 620, the third housing 610 is fastened to the first housing 210, and the third conductive core 620 is electrically connected to the first conductive core 220. The third conductive core 620 is located in the third housing 610 and extends outside the third housing 610 in a direction away from the first connector 200, the third conductive core 620 and the first conductive core 220 are electrically connected to the third housing 610 or inside the first housing 210, and a part that is of the third conductive core 620 and that is located outside the third housing 610 is connected to the photovoltaic module 20 through a cable. A design in which the third connector 600 and the first connector 200 are detachably connected facilitates assembly and disassembly between the photovoltaic module 20 and the inverter 10.

Figure 23:
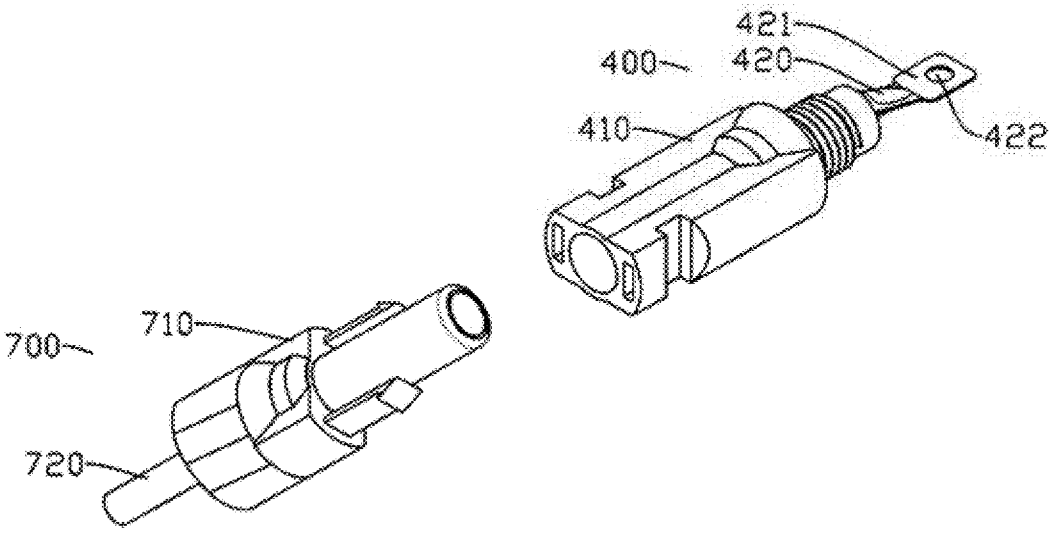
FIG. 23 is a schematic diagram of structures of a second connector and a fourth connector according to an implementation of this disclosure.

In a possible implementation, the inverter 10 further includes a fourth connector 700 (as shown in FIG. 23). The fourth connector 700 is located at an end that is of the second connector 400 and that is away from the inverter 10, the fourth connector 700 includes a fourth housing 710 and a fourth conductive core 720, the fourth housing 710 is fastened to the second housing 410, and the fourth conductive core 720 is electrically connected to the second conductive core 420. The fourth conductive core 720 is located in the fourth housing 710 and extends outside the fourth housing 710 in a direction away from the second connector 400, the fourth conductive core 720 and the second conductive core 420 are electrically connected to the fourth housing 710 or inside the second housing 410, and a part that is of the fourth conductive core 720 and that is located outside the fourth housing 710 is connected to the photovoltaic module 20 through a cable. A design in which the fourth connector 700 and the second connector 400 are detachably connected facilitates assembly and disassembly of the photovoltaic system 1.

Still refer to FIG. 12. This disclosure further provides an inverter 10. The inverter 10 includes a housing 100, a first connector 200, and a socket 114, where a circuit board 110 is disposed on an inner side of the housing 100, and an inverter circuit is disposed in the circuit board 110. The first connector 200 includes a first housing 210 and a first conductive core 220, where the first housing 210 is fastened to the housing 100, the first conductive core 220 is located in the first housing 210 and extends into the inner side of the housing 100, the socket 114 is located on the circuit board 110 and is electrically connected to the circuit board 110, an end that is of the first conductive core 220 and that is located on the inner side of the housing 100 is inserted into the socket 114 and is fastened to the socket 114, to shorten a distance between the first conductive core 220 and the circuit board 110. An end that is of the first conductive core 220 and that is away from a first connecting plate 221 is configured to connect to a photovoltaic module 20, the first conductive core 220 is configured to transmit, by using the first connecting plate 221, a direct current generated by the photovoltaic module 20 to the inverter circuit, and the inverter circuit converts the direct current into an alternating current.

In an implementation, a shape of an end that is of the first conductive core 220 and that is connected to the socket 114 adapts to the socket 114. In FIG. 12, the end that is of the first conductive core 220 and that is connected to the socket 114 is of a flat structure. In another implementation, the end that is of the first conductive core 220 and that is connected to the socket 114 is in a cylindrical shape, a circular shape, a three-dimensional column shape, or the like, and an internal structure of the socket 114 adapts to a shape of the first conductive core 220, so that the first conductive core 220 is electrically connected to the socket 114.

The inverter and the photovoltaic system provided in embodiments of this disclosure are described in detail above. The principle and embodiment of this disclosure are described herein through specific examples. The description about embodiments is merely provided to help understand the method and core ideas of this disclosure. In addition, a person of ordinary skill in the art can make variations and modifications to this disclosure in terms of the specific embodiments and application scopes based on the ideas of this disclosure. Therefore, the content of this specification shall not be construed as a limitation on this disclosure.

What is claimed is:

1. An inverter, comprising:

a housing comprising an inner side;

a circuit board disposed on the inner side;

an inverter circuit disposed on the circuit board and configured to convert a direct current from a photovoltaic module to an alternating current; and a first connector comprising:

a first housing fastened to the housing; and a first conductive core located in the first housing, extending into the inner side, and comprising:

a first conductive core body;

a first connecting plate located on the inner side, wherein the first conductive core body and the first connecting plate are of an integrated structure, wherein the first connecting plate is of a flat structure, wherein the first connecting plate and the circuit board are stacked, and wherein the first connecting plate is fastened to the circuit board and is electrically connected to the inverter circuit; and a first end that is away from the first connecting plate and that is configured to connect to the photovoltaic module, wherein the first conductive core is configured to transmit, by using the first connecting plate, the direct current to the inverter circuit.

2. The inverter of claim 1, wherein the circuit board comprises a board surface that is parallel to the first connecting plate.

3. The inverter of claim 1, wherein the first connecting plate comprises an opening, wherein the inverter further comprises a fastening member, and wherein the fastening member passes through the opening and is fastened to the circuit board to fasten the first connecting plate to the circuit board.

4. The inverter of claim 1, further comprising:

a connection terminal disposed on the circuit board, wherein the first connecting plate, the connection terminal, and the circuit board are sequentially stacked in a first direction, wherein the first direction is perpendicular to the circuit board, and wherein the connection terminal is fastened to the circuit board and is electrically connected to the circuit board;

a pore channel disposed at the connection terminal;

an opening disposed on the first connecting plate; and a fastening member that passes through the opening in the first direction and extends into the pore channel to fasten the first connecting plate to the connection terminal.

5. The inverter of claim 1, wherein the housing further comprises an outer side, wherein the first conductive core body comprises a second end, wherein the first conductive core body passes through the outer side and the inner side, wherein the first connecting plate is located at the second end, and wherein a first extension direction of the first connecting plate is the same as a second extension direction of the first conductive core body.

6. The inverter of claim 5, wherein the first conductive core further comprises a first connection section, wherein the first connection section is located between the first conductive core body and the first connecting plate, and wherein a third extension direction of the first connection section intersects with both the first extension direction and the second extension direction.

7. The inverter of claim 6, wherein the first connector further comprises an insulation part, wherein the first connection section comprises an outer surface, and wherein the insulation part covers the outer surface.

8. The inverter of claim 1, wherein the housing further comprises an outer side, wherein the first conductive core body comprises a second end, wherein the first conductive core body passes through the outer side, wherein the first connecting plate is located at the second end, and wherein a first extension direction of the first connecting plate intersects with a second extension direction of the first conductive core body.

9. The inverter of claim 1, wherein the first connecting plate comprises a peripheral side, and wherein the inverter further comprises a temperature sensor located on the circuit board, located on the peripheral side, and configured to monitor a temperature of the first connecting plate.

10. The inverter of claim 1, further comprising a fastening base located on the inner side, wherein the first connecting plate is connected to the fastening base.

11. The inverter of claim 1, wherein the inverter circuit comprises a negative end and a positive end, wherein the first connecting plate is connected to the positive end, wherein the housing further comprises an outer side, and wherein the inverter further comprises a second connector comprising:

a second housing fastened to the outer side; and a second conductive core located in the second housing, extending into the inner side, and comprising a second connecting plate located on the inner side, fastened to the circuit board, and electrically connected to the negative end.

12. The inverter of claim 11, wherein the first connecting plate and the second connecting plate are staggered such that a first projection that is of the first connecting plate and that is on the circuit board does not overlap a second projection that is of the second connecting plate and that is on the circuit board.

13. The inverter of claim 11, further comprising:

a fastening base located on the inner side;

a fastening groove disposed in the fastening base; and a connecting piece disposed in the fastening groove and comprising:

a second end connected to the circuit board; and a third end fastened and electrically connected to the second connecting plate.

14. An inverter, comprising:

a housing comprising an inner side;

a circuit board disposed on the inner side;

an inverter circuit disposed on the circuit board and configured to convert a direct current from a photovoltaic module to an alternating current;

a first connector comprising:

a first housing fastened to the housing; and a first conductive core located in the first housing, extending into the inner side, and comprising:

a first conductive core body;

a first connecting plate located on the inner side, wherein the first connecting plate is of a flat structure, and wherein the first conductive core body and the first connecting plate are of an integrated structure;

a first end that is away from the first connecting plate and that is configured to connect to the photovoltaic module, wherein the first conductive core is configured to transmit, by using the first connecting plate, the direct current to the inverter circuit; and a second end that is located on the inner side; and a socket located on the circuit board and electrically connected to the circuit board, wherein the second end is inserted into the socket and is fastened to the socket, and wherein the socket connects the first conductive core to the circuit board to shorten a distance between the first conductive core and the circuit board.

15. The inverter of claim 14, wherein the first connecting plate comprises an opening, wherein the inverter further comprises a fastening member, and wherein the fastening member passes through the opening and is fastened to the circuit board to fasten the first connecting plate to the circuit board.

16. The inverter of claim 14, further comprising:

a connection terminal disposed on the circuit board, wherein the first connecting plate, the connection terminal, and the circuit board are sequentially stacked in a first direction, wherein the first direction is perpendicular to the circuit board, and wherein the connection terminal is fastened to the circuit board and is electrically connected to the circuit board;

a pore channel disposed at the connection terminal;

an opening disposed on the first connecting plate; and a fastening member that passes through the opening in the first direction and extends into the pore channel to fasten the first connecting plate to the connection terminal.

17. The inverter of claim 14, wherein the housing further comprises an outer side, wherein the first conductive core body passes through the outer side and the inner side, wherein the first connecting plate is located at the second end, and wherein a first extension direction of the first connecting plate is the same as a second extension direction of the first conductive core body.

18. The inverter of claim 17, wherein the first conductive core further comprises a first connection section, wherein the first connection section is located between the first conductive core body and the first connecting plate, and wherein a third extension direction of the first connection section intersects with both the first extension direction and the second extension direction.

19. The inverter of claim 14, wherein the housing further comprises an outer side, wherein the first conductive core body passes through the outer side and the inner side, wherein the first connecting plate is located at the second end, and wherein a first extension direction of the first connecting plate intersects with a second extension direction of the first conductive core body.

* * * * *